July 8, 1958          L. MARTIN          2,842,688

LINEAR RATE GENERATOR

Filed Oct. 30, 1953

INVENTOR.
LYLE MARTIN
BY Robert C. Smith
ATTORNEY

United States Patent Office 2,842,688
Patented July 8, 1958

2,842,688

LINEAR RATE GENERATOR

Lyle Martin, South Bend, Ind., assignor to Bendix Aviation Corporation, South Bend, Ind., a corporation of Delaware Application October 30, 1953, Serial No. 389,293

4 Claims. (Cl. 310—15)

This invention relates to devices for the generation of electrical voltages and more specifically to a device for generating a voltage as a particular function of a linear velocity.

It sometimes becomes necessary that the linear travel of a particular member be regulated within extremely close limits. To accomplish this regulation, some means of damping must be provided to prevent the controlled member from oscillating or hunting about the optimum position. The particular application for the device herein disclosed is as a follower mechanism creating a feedback signal for a linearly actuated fuel valve controlled by an electrical circuit, but it is applicable to the control of any member having a linear motion.

It is an object of the present invention to provide a means for generating an electrical signal having a desired characteristic from a linear motion.

It is another object of the present invention to provide an electrical generator capable of producing a voltage which varies linearly with changes in rate of travel of its prime mover.

It is another object of the present invention to produce a device which will accomplish the above objects with extreme simplicity and ruggedness of design.

Other objects and advantages will become apparent from the following specification in which.

Figure 1:
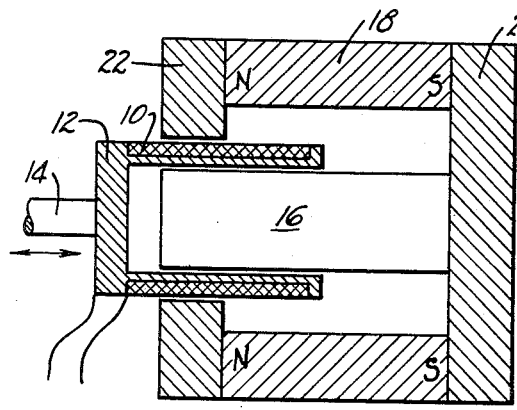
Figure 1 is a sectional view of an elementary form of the invention.

Referring to Figure 1, a coil 10 is wound on a hollow, insulated cylindrical drum 12 which is of non-magnetic material and which is moved laterally by means of a shaft 14, said shaft being driven by any linearly moving member which it is desired to control. Drum 12 is moved over an armature 16 which forms part of the magnetic path of an annular permanent magnet 18. The path is completed by a solid iron or steel disc 20 which is placed over one end of the magnet 18 and to which armature 16 is attached, and a similar disc 22, having a hole or bore therein of sufficient size to allow coil 10 to move without interference. Magnetic lines of flux created by magnet 18 are distributed radially from the armature 16 across coil 10 into end disc 22, through magnet 18 and end disc 20 and back to the armature. As coil 10 moves in either direction on armature 16, magnetic lines are cut and an electromotive force is generated which is proportional in magnitude to the velocity with which the coil is moved. By varying the manner of winding coil 10 or the reluctance of the flux path, any of several characteristic response curves such as parabolic or irregular curves might be obtained. In the present case, it was desired that the voltage output be linear with respect to the instantaneous position of the coil.

Figure 2:
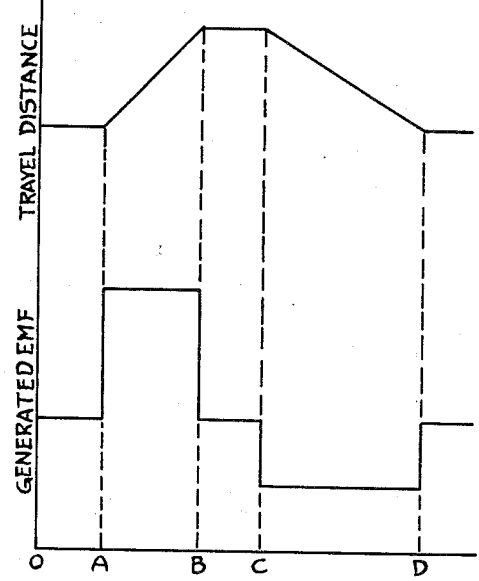
Figure 2 is a graph showing the manner in which voltage generated varies with the rate of change of travel of the prime mover.

The output characteristic of this generator is shown in Figure 2 in which voltage output and travel distance are plotted on the vertical axis, and time is plotted on the horizontal axis. During time O–A, the coil 10 does not move and no voltage is generated. From time A to time B the coil moves with a uniform velocity in a positive direction, and it will be observed that a substantial and uniform positive E. M. F. is generated. During time B–C the coil remains stationary at a new position and no voltage is developed. Travel of the coil from C to D is in a negative direction and over a longer period of time than from A to B. Consequently, the E. M. F. generated is smaller in magnitude and negative in direction. Thus it will be seen that the voltage generated has a polarity dependent upon the direction of coil movement, and a magnitude linearly proportional to the rate of change of position (velocity) of the coil.

Figure 3:
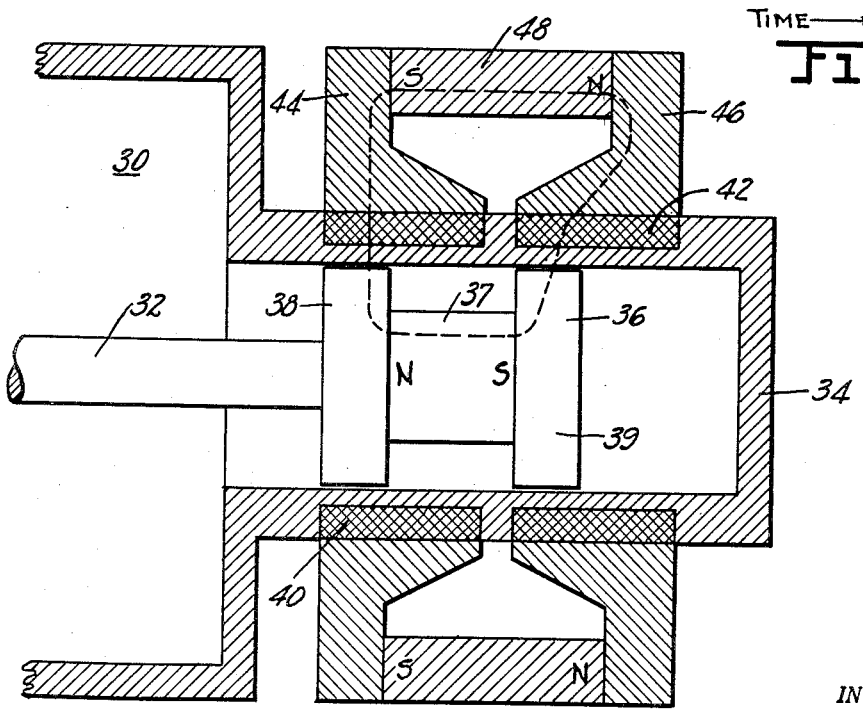
Figure 3 is a sectional view of a form of the invention adapted for use as a follower of a linearly actuated valve.

In Figure 3 is shown a modification of my invention adapted as a follower for a fuel valve having a linear motion. This modification makes it possible to immerse the translating member in fuel while keeping the electrical windings separate from the fuel flowing through the valve. A portion of the fuel valve housing is shown at numeral 30 with a shaft 32 driven by a fuel valve (not shown) extending from said housing into a smaller cylindrical portion 34. At the end of said shaft is a spool 36 composed of a permanent magnet 37 and two pole pieces 38 and 39. Embedded into the nonmagnetic casing of cylindrical member 34 are two coils 40 and 42 which are connected in series. Immediately adjacent these coils are annular pole pieces 44 and 46 which provide a flux path between coils 40 and 42 and an annular permanent magnet 48. It will be observed that the poles of magnets 37 and 48 are so arranged that a closed loop of magnetic lines of flux is established around a path approximately indicated by the dotted line. Inasmuch as all of members 36, 44, 46, and 48 are of ferrous material, the greatest number of lines of flux will follow a path within these members and, as a result, will intersect coils 40 and 42. When spool 36 is moved, these magnetic lines of force are moved, and in so moving, cross coils 40 and 42, thereby generating an electromotive force. As in the case of Figure 1 the voltage generated is essentially linear with respect to translation of the spool within the limits of its normal travel. When voltage requirements are high, a plurality of spools may be driven by shaft 32, each having its associated coils, magnets, and pole pieces.

During the operation of the device of Figure 3, the motion of the fuel valve (not shown) imparts a linear motion to spool 36. There is generated in coils 40 and 42 a voltage which is linear with respect to the translation of spool 36 and proportional to the velocity of the spool. This generated voltage is then used in the manner appropriate to the control device with which said coils are connected to anticipate the arrival of the fuel valve at the lateral position corresponding to desired fuel flow, thus preventing overshooting or hunting around this point. Should the spool be moved in the opposite direction at the same speed as in example above, the generated E. M. F. will be of the same magnitude and linear with respect to the distance travelled, but will be of opposite polarity.

The present invention is obviously capable of being utilized in a great variety of forms and shapes, and it is to be understood that the invention is not to be limited to the embodiments disclosed.

I claim:

1. A device for creating a voltage from a linear motion comprising a cylindrical housing of non-magnetic material, a plurality of coils of wire embedded in grooves on the outside of said housing, a spool adapted to reciprocate in said cylindrical housing, said spool containing a permanent magnet and having a land of magnetic material for each of said coils, annular pole pieces of magnetic material arranged adjacent to and concentrically with each of said coils, and an annular permanent magnet positioned between said pole pieces and concentrically with said cylindrical housing.

2. A voltage generator comprising a cylindrical housing, a plurality of coils of wire wound on the outside of said housing, a spool containing a permanent magnet and a plurality of lands adapted to reciprocate in said housing, an annular permanent magnet positioned concentrically with said spool and said coils, and pole pieces in contacting engagement with said coils and said annular magnet arranged to direct a flux path across said coils.

3. A voltage generator comprising a cylindrical housing of non-magnetic material, two coils of wire connected in series and embedded in grooves on the outside of said housing, a spool adapted to reciprocate in said housing containing an axially magnetized permanent magnet and having two lands, each of which occupies approximately the same axial position with respect to one of said coils as does the other, an annular permanent magnet positioned concentrically with said coils which is magnetized axially and polarized in a direction opposite to said first named magnet, and ring-shaped pole pieces in contacting engagement with said coils and with said annular permanent magnet.

4. A voltage generator comprising a cylindrical housing of non-magnetic material, two coils of wire connected in series and embedded in grooves on the outside of said housing, a spool adapted to reciprocate in said housing containing an axially magnetized permanent magnet and having two lands, each of which occupies approximately the same axial position with respect to one of said coils as does the other, and an annular member containing a permanent magnet and having an approximately horseshoe-shaped cross section arranged concentrically with and in contacting engagement with said coils.

References Cited in the file of this patent
UNITED STATES PATENTS

| | | |
|---|---|---|
| 1,290,190 | Herrick | Jan. 7, 1919 |
| 2,362,151 | Ostenberg | Nov. 7, 1944 |
| 2,409,857 | Hines | Oct. 22, 1946 |
| 2,557,080 | Dawson | June 19, 1951 |
| 2,596,048 | Severs | May 6, 1952 |
| 2,621,224 | Priest | Dec. 9, 1952 |
| 2,651,769 | Stafford | Sept. 8, 1953 |
| 2,675,533 | Brown | Apr. 13, 1954 |
| 2,740,946 | Geneslay | Apr. 3, 1956 |